March 14, 1944. H. J. OGORZALY 2,344,449
TREATING HYDROCARBON FLUIDS
Filed April 5, 1941 2 Sheets-Sheet 1

Henry J. Ogorzaly Inventor
By P.L. Young Attorney

March 14, 1944. H. J. OGORZALY 2,344,449
TREATING HYDROCARBON FLUIDS
Filed April 5, 1941 2 Sheets-Sheet 2

Henry J. Ogorzaly Inventor
By ____ Attorney

Patented Mar. 14, 1944

2,344,449

UNITED STATES PATENT OFFICE 2,344,449

TREATING HYDROCARBON FLUIDS

Henry J. Ogorzaly, Baton Rouge, La., assignor to Standard Oil Development Company, a corporation of Delaware Application April 5, 1941, Serial No. 386,958

9 Claims. (Cl. 196—52)

This invention relates to treating hydrocarbon fluids and more particularly relates to the catalytic conversion of higher boiling hydrocarbons to lower boiling hydrocarbons.

In the catalytic cracking of hydrocarbons it is known that the catalysts become fouled and inactive after a certain period of use and must be either replaced or regenerated. It is more economical to regenerate most catalysts to remove carbonaceous deposits therefrom than to throw the catalyst away. During the catalytic cracking, heavy molecules are adsorbed on the catalyst surfaces and due to the high temperature used in the reaction, these heavy molecules are broken down to carbonaceous deposits and gas. If the time of contact between the catalyst and the hydrocarbon vapors is reduced and if the heavy molecules formed during the conversion are rapidly removed from the catalyst particles, the life of the catalyst will be increased.

According to one form of my invention, a moving catalyst in powdered form or in the form of relatively small particles is passed in sequence through alternate zones in which hydrocarbon vapors or gases and superheated steam are flowing. The catalyst particles pass through a number of such alternate zones before regeneration of the catalyst particles is carried out. Short times of contact of the catalyst with the hydrocarbons and steam in each zone are used.

The hydrocarbons to be converted are heated to an elevated temperature and the resulting hydrocarbon vapors are passed through alternate zones where catalyst particles are contacted. Superheated steam is used in alternate zones between the hydrocarbon vapor zones to strip residual hydrocarbons from the catalyst particles before the residual hydrocarbons are changed to carbonaceous deposits. In each of the zones the flow of vapor or gas is substantially continuous. My invention may also be used in other conversion operations, such as catalytic reforming, dehydrogenation, etc.

In another form of my invention hydrocarbon mixtures to be separated into different fractions are vaporized and passed through a plurality of alternate zones and contacted with moving particles of a contacting agent. Superheated steam is used in a plurality of alternate streams to purge the contact particles of adsorbed hydrocarbons. In this form of the invention the adsorbing or contacting agent is preferably non-catalytic in that the action is merely physical. The contacting agent adsorbs the higher boiling hydrocarbons while permitting the lower boiling hydrocarbons to pass through the contacting agent so that a rough separation of hydrocarbon constituents is effected. The mixture of hydrocarbons may comprise reaction products resulting from a cracking operation which may be passed through alternate zones to separate heavy hydrocarbons from lighter hydrocarbons in the mixture of cracked products. The separated heavy hydrocarbons can be recycled to the cracking zone.

Using this form of my invention, it is not necessary to condense the products of reaction resulting from a cracking operation to fractionate the products and in this way a saving in heat is provided. This form of my invention may also be used to separate higher molecular weight normally gaseous hydrocarbons from lower molecular weight normally gaseous hydrocarbons in gaseous hydrocarbon mixtures.

In the drawings Figure 1 represents a combination of apparatus adapted to carry out the process according to one form of my invention;

Figure 1:
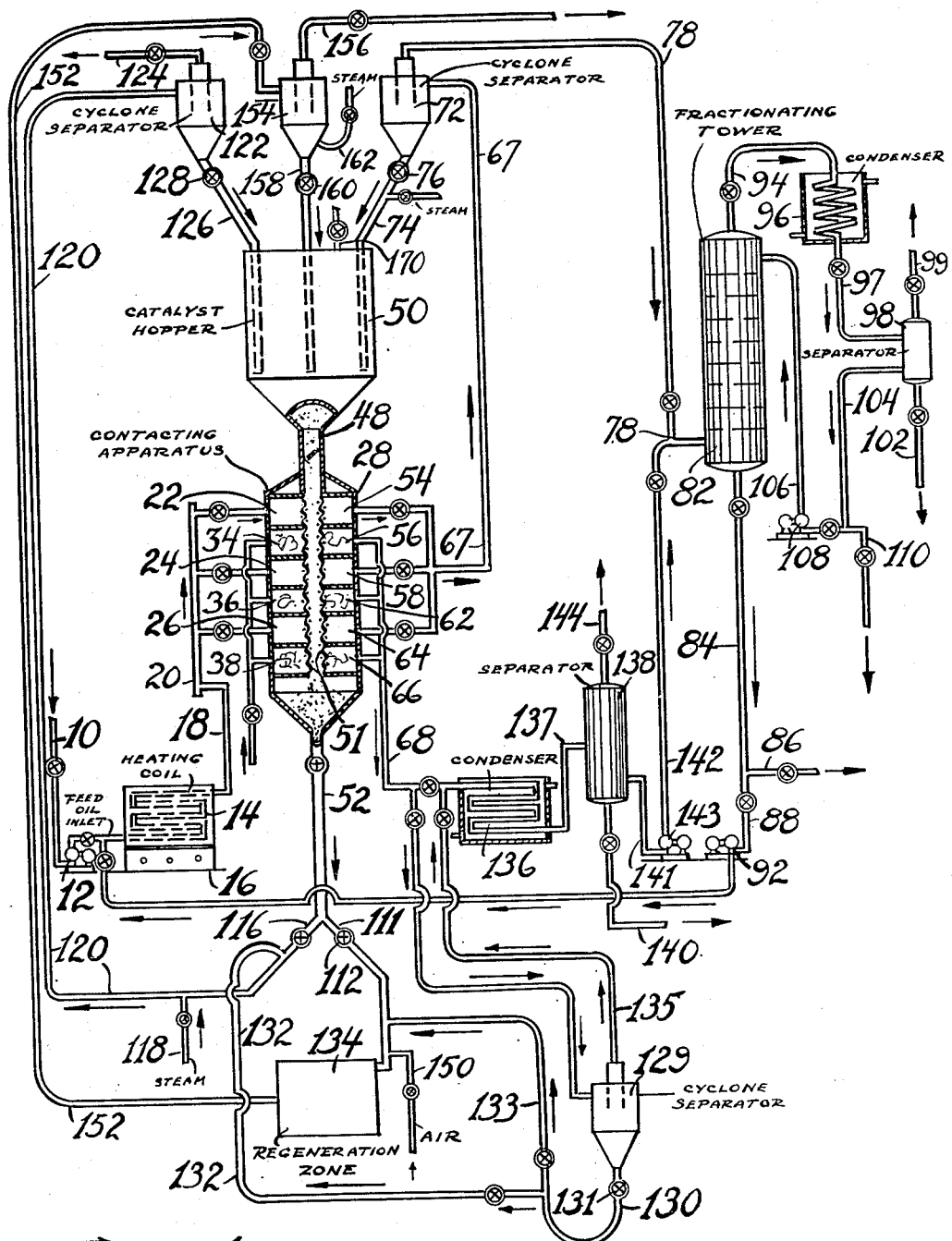

Referring now to the drawings, the reference character 10 designates a line through which feed oil is passed by means of pump 12. The oil feed comprises any suitable cracking oil stock such as gas oil, reduced crude or the like. The oil feed is passed through the heating coil 14 in heating zone 16 and the resulting vapors at a temperature of about 850° F. to 1000° F. are passed through line 18. If desired, a separator may be placed in line 18 to separate any unvaporized hydrocarbons.

The hydrocarbon vapors are introduced into a manifold 20 from which they are fed to branch lines 22, 24 and 26 as alternate streams of hydrocarbons passing through a moving catalyst. The alternate streams of hydrocarbons are passed through the contacting apparatus generally designated 28 and shown in greater detail in Figures 2 and 3. The contacting device or apparatus shown represents one form of an apparatus for contacting a plurality of hydrocarbon streams with a moving bed of catalyst but the invention is not to be restricted to this form as any suitable type of apparatus may be used for carrying out my invention.

Figures 2, 3:
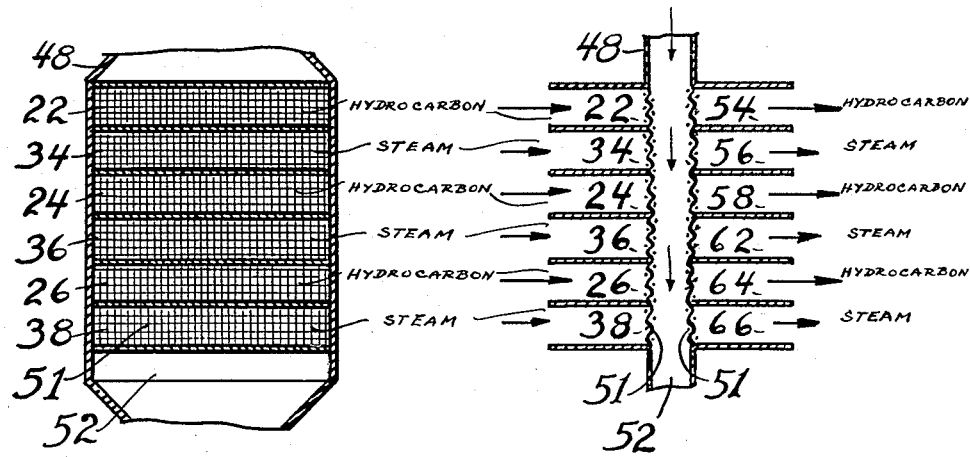
Figure 2 represents an end view of the apparatus whereby alternate zones of hydrocarbons are contacted with moving catalyst or contact particles.
Figure 3 represents a side view of the apparatus shown in Figure 2.

As shown in Figure 2, the branch lines 22, 24 and 26 comprise narrow elongated conduits which are substantially rectangular in cross section. Arranged between the conduits 22, 24 and 26 are steam conduits 34, 36 and 38 which are of substantially the same construction as the conduits for the hydrocarbon vapors. The steam entering conduits 34, 36 and 38 is maintained at a temperature equal to a rislightly higher than the desired reaction temperature.

Catalyst is introduced into the contact apparatus 28 by means of line 48 which communicates with the bottom of catalyst hopper 50. The catalyst preferably is made up of relatively coarse particles of about 8 to about 200 mesh. The catalyst may be any suitable cracking catalyst such as synthetic gels containing silica and alumina or silica and magnesia, activated natural clays such as acid treated bentonite or the like. The invention is not to be restricted to these catalysts as many other catalysts may be used.

As shown in Figures 2 and 3, the line 48 comprises an elongated narrow conduit substantially rectangular ni cross section for feeding catalyst particles in a rectangular shaped bed whose thickness is related to the rate of flow of oil vapors by the degree of concersion desired. The catalyst particles move downwardly through the conduit 48 and past the hydrocarbon and steam conduits 22, 24, 26, 34, 36 and 38. Screens or perforated members 51 are provided to confine the catalyst bed. The screens 51 form an extension of the inlet conduit 48 past the hydrocarbon and steam conduits. With this construction, the catalyst particles move downwardly through the conduit 48 as a catalyst bed and alternate streams of hydrocarbon vapors or gases and superheated steam are passed transversely through the moving bed of catalyst. Preferably the pressure in the steam zones is kept slightly above that in the oil zones in order to prevent leakage of the oil.

After passing through the conduit 48, the catalyst particles leave the bottom of the contact apparatus 28 through line 52. While a certain number of conduits for hydrocarbon and steam have been shown in the drawings, it is to be understood that the invention is not restricted to the number shown and the number of conduits may be varied. For example, the number of conduits may be increased so that the catalyst particles leaving the contact apparatus 28 through line 52 are contaminated with carbonaceous deposits and must be reactivated or regenerated before being further used in the process. If the number of hydrocarbon and steam conduits is not too great and the catalyst particles leaving through line 52 are not contaminated to too great an extent, the catalyst particles may be recycled to the catalyst hopper 50 as will be hereinafter described in greater detail.

The alternate streams of hydrocarbon and superheated steam after passing through the bed of catalyst moving through the conduit 48 are kept as separate streams and are passed through flat relatively wide conduits 54, 58, 64, 56, 62 and 66 which are in substantial alignment with the conduits 22, 24, 26, 34, 36 and 38 positioned on the other side of the moving bed of catalyst. The conduits 54, 56, 58, 62, 64 and 66 are adapted to receive alternate streams of hydrocarbon and superheated steam.

The hydrocarbon conversion products in lines 54, 58 and 64 are preferably combined as a single stream and passed through line 67 and further treated as will be presently described. The purging gas such as superheated steam passing through lines 56, 62 and 66 is passed through line 68 and further treated to remove catalyst particles therefrom and to condense the steam as will be hereinafter described in greater detail.

The products of conversion passing through line 67 are preferably introduced into a separating means 72 to separate entrained solids from vapors and gases. The separating means may comprise any suitable apparatus such as a cyclone separator. The hydrocarbon vapors passing through the moving bed of catalyst in conduit 48 carry along some of the smaller catalyst particles and it is desirable to remove these catalyst particles from the products of conversion before condensing and fractionating to separate desired constituents. When relatively coarse catalyst particles are used, there will be substantially no entrainment of solids in the vapors and the separating means 72 may be omitted, if desired.

The solid catalyst particles separated in the separator 72 are reutrned to the catalyst hopper 50 by means of line 74 having a normally open valve 76. Preferably the line 74 extends into the catalyst hopper below the level of catalyst contained therein. A small amount of stripping steam may be added to line 74 to strip hydrocarbons from the catalyst and to prevent hydrocarbons being carried with the catalyst into catalyst hopper 50.

The separated vapors and gases pass overhead through line 78 and are introduced into a fractionating tower 82 for separating condensate oil from lower boiling hydrocarbons. The condensate oil is withdrawn from the bottom of the fractionating tower 82 through line 84 and a portion or all the condensed oil may be removed from the system through valved line 86. The remaining part of the condensate oil may be passed through line 88 by pump 92 and returned to the heating coil 14 for vaporizing and recycling through the apparatus.

The lower boiling hydrocarbons pass overhead as vapors through line 94 and are cooled and condensed in condenser 96 wherein any steam employed for vaporization or mixed with the hydrocarbon stream during passage through apparatus 28 is also condensed. The condensed hydrocarbons and water are passed through line 97 to a separator 98 for separating water and hydrocarbons from hydrocarbon gases. Normally gaseous hydrocarbons are released from separator 98 through overhead line 99. The water is removed from the bottom of the separator 98 through valved line 102. The normally liquid hydrocarbons are withdrawn through line 104 and a portion thereof returned through line 106 by pump 108 to the top of tower 82 as reflux. The remaining part of the normally liquid hydrocarbons is withdrawn through valved line 110.

Returning now to the contaminated catalyst leaving contact apparatus 28 through line 52, the contaminated catalyst particles may be passed through line 111 having a star feeder 112 and regenerated in any suitable manner to remove carbonaceous deposits therefrom. In regenerating, especially where clay catalysts are used, it is important to keep the regeneration temperature below about 1100° F. and the temperature during regeneration must be controlled to prevent overheating of the catalyst particles. Preferably air is used as the regenerating medium. When synthetic catalysts are used, temperatures up to 1200° F. to 1400° F. may be used. The regenerated catalyst is returned to the catalyst hopper 50 as will be hereinafter described in greater detail.

In some instances it is desirable to recycle the partially inactivated catalyst from line 52 before regenerating it. In these cases if the catalyst particles are sufficiently small, they are passed through line 116, mixed with steam introduced through line 118 to form a suspension of catalyst particles in steam or other inert gas. The suspension of catalyst particles in the inert gas is passed through line 120 and introduced into a separating means 122 for separating the solid catalyst particles from the inert gas. A heater may be inserted in line 120, if desired, for reheating the catalyst particles being returned to hopper 50. The separating means 122 may be any suitable apparatus such as a cyclone separator. The inert gas passes overhead through line 124. The separated catalyst particles are withdrawn from the bottom of the separating means 122 through line 126 having a normally open valve 128. Preferably the line 126 extends to near the bottom of the hopper 50 and below the level of catalyst in the hopper 50. If the catalyst particles are too large to be supported by a high velocity stream of steam or other inert gas they may be returned to catalyst hopper 50 by other suitable means not shown, such as pocket conveyors or travelling metallic belts.

The purging gas or steam after having passed through the moving bed of catalyst may contain catalyst particles removed from the moving bed of catalyst and the purging gas is preferably passed through line 68 to a separating means such as a cyclone separator 129 to separate catalyst particles from gas. The catalyst particles collect in the hopper of separator 129 and are withdrawn therefrom through line 130 having a star feeder 131. Separator 129 is preferably placed on the same level as reactor 28 whereby the separated catalyst may be moved to other parts of the apparatus. The separated catalyst particles or a part thereof may be passed to hopper 50 through line 132, mixed with used catalyst in line 116 and the mixture returned to the hopper through line 120. All or a part of the catalyst particles from cyclone 129 may be passed through line 133 for mixture with catalyst particles in line 111 and the mixture passed through the regeneration zone 134 later to be described in greater detail. The separated gas passes overhead through line 135 and is cooled in the condenser 136 to condense the water and higher molecular weight hydrocarbons and the cooled and condensed mixture is passed through line 137 and introduced into a separator 138. Water is withdrawn from the separator 138 as the bottom layer through line 140. Normally liquid hydrocarbons are withdrawn as a layer above the water through line 141 and may, if desired, be passed through line 142 by means of pump 143 to line 78 entering fractionator 82. Normally gaseous hydrocarbons are withdrawn overhead through line 144.

The length of the period during which the catalyst is in contact with the oil vapors is established by its rate of flow and the time of contact of the hydrocarbon vapors with the catalyst bed is independently controlled by the velocity of the oil stream. For any given thickness of the moving catalyst bed the rate of flow of the oil stream may be adjusted to give the desired conversion level. The time of contact of the catalyst particles with the hydrocarbon vapors between purgings or strippings is relatively short, for example, in the range of about 10 second to 10 minutes, although longer periods of time may be used in some instances.

The catalyst particles to be regenerated are passed through line 111, mixed with a suitable amount of air or other oxidizing agent introduced through line 150 and the mixture passed through regeneration zone 134 wherein the temperature is controlled as above described to prevent overheating of the catalyst particles. The regenerated catalyst particles in suspension are passed through line 152 to a separating means 154 such as a cyclone separator to separate solids from gases. The gases pass overhead through line 156.

The separated catalyst particles are collected in the cyclone and are passed through bottom pipe 158 having a valve 160 to the catalyst hopper 50. Steam is admitted into the bottom portion of cyclone hopper 154 through valved line 162 to purge the regenerated catalyst particles of oxygen. The hot regenerated catalyst particles are mixed in hopper 50 with the purged catalyst returned through line 120 and this provides another way of heating the used catalyst from line 120. The catalyst particles being returned through line 120 may also be reheated by using superheated steam or high temperature inert gas as the suspension medium introduced through line 118.

When the catalyst in hopper 50 is at too low a temperature, a steaming zone (not shown) similar to steaming zones 34, 36 and 38 may be used for contacting the catalyst particles with superheated steam or high temperature inert gas to bring the catalyst particles to the desired temperature.

Fresh catalyst is added to hopper 50 through line 170.

In endothermic reactions such as cracking there will be a decreasing temperature gradient transversely of the catalyst bed. Better product distribution is obtained if the temperature is substantially uniform throughout the catalyst bed. The use of superheated steam in conduits 34, 36 and 38 will tend to produce a substantially uniform temperature in the catalyst bed and will have a temperature smoothing effect.

In addition, unless the oil vapors are introduced at a temperature higher than that of the catalyst, there will be a progressive decrease in the temperature of the moving catalyst, since heat is used up in each cracking zone. It is preferable to add heat by using the steam at a slightly higher temperature than that of the hydrocarbon feed and in this way the temperature of the catalyst may be kept substantially uniform throughout the length of the reaction zone 28.

As the catalyst particles move through the reaction zone 28, there will be some deposition of carbon and the catalyst particles will have decreased activity. This decrease in catalyst activity can be compensated for by progressively increasing the depth of the cracking zones toward the bottom of the reaction zone. Or the bed of catalyst may be maintained substantially constant in horizontal cross section and the pressure drop across each cracking zone be adjusted to decrease the throughput of hydrocarbons in the lower portion of the reaction zone. The pressure drop can be decreased by inserting orifices or other similar restrictions in the path of the hydrocarbon stream.

The invention may also be used for separating desired constituents from hydrocarbon mixtures without effecting any conversion of the hydrocarbon constituents. My invention may also be used for the selective adsorption of heavy hydrocarbon vapors followed by short purging cycles as a means of fractionating cracked hydrocarbon vapors or other hydrocarbon mixtures. The adsorbing agent may be any suitable one such as, for example, silica gel. The adsorbing agent may be regenerated at desired intervals to remove any carbonaceous or other deposits.

The apparatus shown in Figure 1 and more specifically the contact apparatus shown in Figures 2 and 3 may be used for fractionation by selective adsorption. The adsorbed agent is moved along and contacted with alternate streams of hydrocarbon mixtures and purging gas, the purging gas acting to remove adsorbed higher boiling hydrocarbons from the mixture. The lighter hydrocarbons are not adsorbed and pass through the bed of moving adsorbing agent.

My invention also contemplates using two units of the type shown in Figure 2 in series, one being operated as a cracking unit and the other as a fractionating unit. The cracking unit would function as previously described. The reaction vapors leaving the cracking unit through conduits 54, 58 and 64 would be passed as alternate streams through the same kind of apparatus as shown in Figure 2 and would be contacted with an adsorbing or contacting agent which may or may not be catalytic and which may or may not be of the same material as the catalyst in the cracking unit.

In passing through the second or fractionating unit, lower boiling hydrocarbons in the reaction vapors are not adsorbed to any extent and pass through the adsorbing agent to a fractionating tower to separate desired hydrocarbons from higher boiling hydrocarbons. Higher boiling hydrocarbons in the reaction vapors are adsorbed to a greater extent than lower boiling hydrocarbons and the adsorbed hydrocarbons are removed by stream or other gas in alternate stages and are preferably returned to the cracking unit for further conversion. In this way a rough separation may be effected of the reaction vapors without intermediate condensation. The cracking and fractionating units may be operated at substantially the same temperatures or at different temperatures.

Figure 4:
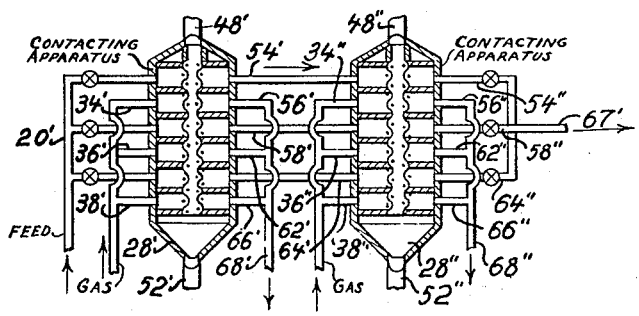
Figure 4 represents a modification of my invention.

The arrangement just described is shown in Figure 4 where the first contacting zone 28' is similar to the contacting zone 28 shown in Figure 1. The cracked vapors or products of conversion are passed through lines 54', 58' and 64' leading to a second contacting zone 28'' similar to the other contacting zones. Higher boiling hydrocarbons are adsorbed on the contacting material passing through the contacting zone and the lower boiling unadsorbed hydrocarbons are conducted through lines 54'', 58'' and 64'' and line 67'. Alternate streams of purging gas are introduced into second zone 28'' through lines 34'', 36'' and 38'' and the streams of purging gas leave through lines 56'', 62'' and 66'' and then through line 68''.

While certain temperatures and times of contact have been given in the above description, it is to be understood that these are by way of example only and the invention is not to be restricted thereto.

I claim:

1. A method of treating hydrocarbon fluids which comprises moving a bed of catalyst particles through a contacting zone, contacting the moving catalyst particles first with hydrocarbon vapors heated substantially to a conversion temperature whereby catalytic conversion of higher boiling hydrocarbons to lower boiling hydrocarbons takes place, immediately purging the moving catalyst particles in said contacting zone following the conversion step to remove heavy adsorbed hydrocarbon molecules from the catalyst particles and then repeating the conversion and purging steps in said contacting zone until the activity of the catalyst particles is materially decreased and it is necessary to regenerate the catalyst particles.

2. A method according to claim 1 wherein the purging agent comprises an inert gas at a slightly higher temperature than the hydrocarbons to add heat to the catalyst particles.

3. A method according to claim 1 wherein the purging gas used for purging the catalyst particles is under a slightly higher pressure than the hydrocarbons to prevent leakage of the hydrocarbons to the purging zones.

4. A method of treating hydrocarbon fluids which comprises moving a bed of catalyst particles through a contacting zone, contacting the moving catalyst particles first with hydrocarbon vapors heated substantially to a conversion temperature whereby catalytic conversion of the hydrocarbons is effected, immediately purging the moving catalyst particles in said contacting zone to remove heavy hydrocarbons therefrom and then repeating the conversion and purging steps in said contacting zone until the activity of the catalyst particles is materially decreased.

5. A method of treating hydrocarbon fluids which comprises moving a bed of catalyst particles through a contacting zone, contacting the moving catalyst particles first with hydrocarbon vapors heated substantially to a conversion temperature whereby catalytic conversion of higher boiling hydrocarbons to lower boiling hydrocarbons takes place, immediately purging the moving catalyst particles in said contacting zone following the conversion step to remove adsorbed heavy hydrocarbon molecules from the catalyst particles and then repeating the conversion and purging steps in said contacting zone until the activity of the catalyst particles is materially decreased and it is necessary to regenerate the catalyst particles and separately condensing the hydrocarbons from the conversion steps and from the purging steps.

6. A method of separating higher boiling hydrocarbons from lower boiling hydrocarbons which comprises passing a moving bed of particles of an adsorbing agent through a contacting zone, contacting the particles with cracked hydrocarbon vapors at a relatively high temperature to adsorb higher boiling hydrocarbons on the particles of adsorbing agent while permitting the lighter hydrocarbons to pass through the bed of adsorbing agent, then purging the moving bed of particles of adsorbing agent in said contacting zone to remove the adsorbed higher boiling hydrocarbons and treating additional alternate streams of cracked hydrocarbon vapors and purging gas with the particles of adsorbing agent in said contacting zone whereby higher boiling hydrocarbons are separated from lower boiling hydrocarbons without the necessity of condensing the products of conversion.

7. A method according to claim 1 wherein the products of conversion from said contacting zone are passed as alternate streams separated by purging streams through a fractionating zone comprising a stream of contacting particles to separate higher boiling from lower boiling hydrocarbons and the contacting particles are purged by said purging streams to remove adsorbed higher boiling hydrocarbons between the contacting zones for the products of conversion and recovering the unadsorbed lower boiling hydrocarbons.

8. A method according to claim 1 wherein the products of conversion from said contacting zone are passed as alternate streams separated by purging streams through a fractionating zone comprising a stream of contacting particles to separate higher boiling from lower boiling hydrocarbons and the contacting particles are purged by said purging streams to remove adsorbed higher boiling hydrocarbons between the contacting zones for the products of conversion and returning the separated higher boiling hydrocarbons to the conversion step.

9. A method according to claim 1 wherein at least a part of the deactivated catalyst particles is regenerated to burn off carbonaceous deposits and the hot regenerated catalyst particles are mixed with another part of the purged deactivated catalyst particles to heat the deactivated catalyst particles before returning the mixture to the contacting zone.

HENRY J. OGORZALY.